United States Patent [19]

Buehring

[11] 4,203,111
[45] May 13, 1980

[54] RADAR DEVICE INCLUDING A CIRCUIT ARRANGEMENT FOR REDUCING INTERFERENCE

[75] Inventor: Walter Buehring, Meckenheim, Fed. Rep. of Germany

[73] Assignee: Siemens Aktiengesellschaft, Berlin & Munich, Fed. Rep. of Germany

[21] Appl. No.: 924,162

[22] Filed: Jul. 13, 1978

[30] Foreign Application Priority Data

Aug. 17, 1977 [DE] Fed. Rep. of Germany ....... 2737088

[51] Int. Cl.² .............................................. G01S 9/42
[52] U.S. Cl. ..................................................... 343/7.7
[58] Field of Search ........................................ 343/7.7

[56] References Cited
U.S. PATENT DOCUMENTS

| | | | |
|---|---|---|---|
| 3,786,509 | 1/1974 | Applebaum et al. | 343/7.7 X |
| 4,024,541 | 5/1977 | Albanese et al. | 343/7.7 X |
| 4,119,962 | 10/1978 | Lewis | 343/7.7 |

*Primary Examiner*—T. H. Tubbesing
*Attorney, Agent, or Firm*—Hill, Van Santen, Steadman, Chiara & Simpson

[57] ABSTRACT

A radar device such as the type which uses a non-constantly scanning radar antenna including a circuit arrangement for reducing interference due to ground reflection wherein an interference value is subtracted from the sampled received signal and wherein the interference value is obtained by recursively calculating from the sampled values with the use of a recursion factor which changes during the sampling sequence so as to reduce interference due to ground reflections and allow the detections of objects which are moving slowly in the radial direction.

2 Claims, 1 Drawing Figure

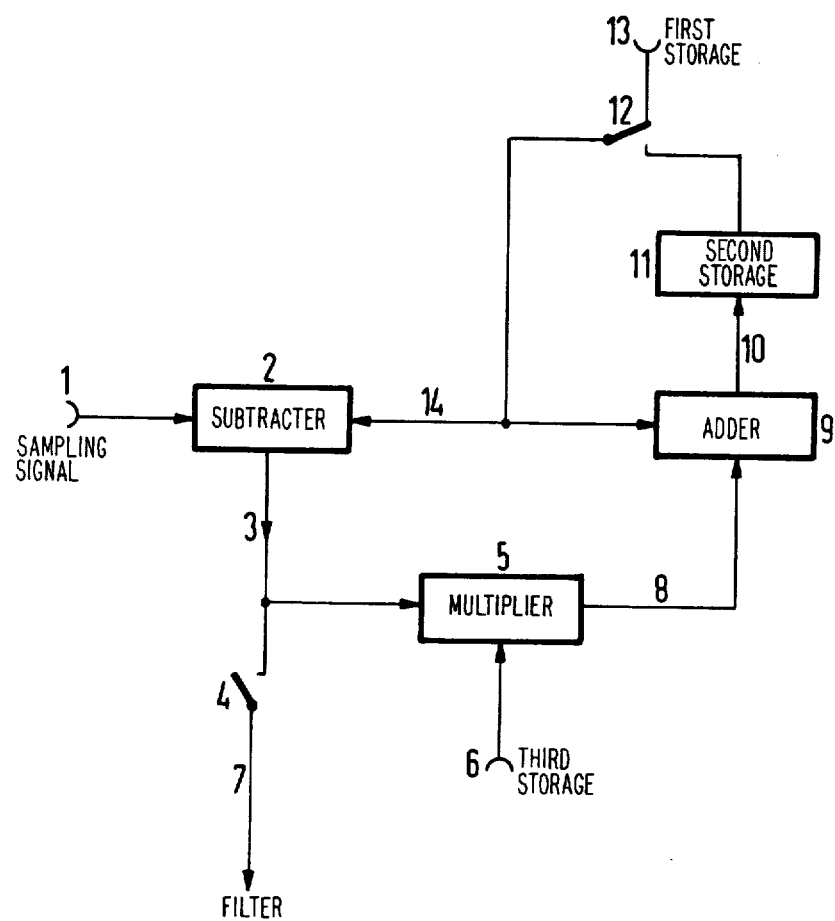

RADAR DEVICE INCLUDING A CIRCUIT ARRANGEMENT FOR REDUCING INTERFERENCE

BACKGROUND OF THE INVENTION

1. Field of the Invention

This invention relates in general to a radar device and in particular to a radar device utilizing a non-constantly scanning radar antenna having a circular arrangement for reducing interference caused by a ground reflection.

2. Description of the Prior Art

As described at pages 35-12 to 35-14 of the publication entitled "Radar Handbook" by Skolnik (McGraw-Hill, 1970) describes the manner of processing scanning sequences employing filters so as to suppress ground echoes in moving target indicators (MTI), and particularly in the case of non-constant spatial scanning by the antenna the so-called "step scan method". The scanning sequence must be of sufficient length to allow the build-up effect of the filter to die away. This effect reduces the discovery of objects having a slow radial movement in zones subject to ground reflection which is possible because of the omission of the scanning modulation of the interference echoes and also prevents the use of sequential detection processes such as described for example on pages 15-19 to 15-27 of the above referenced "Radar Handbook".

Pages 1551-1552 from the Proceedings of the IEEE, Vol. 60, No. 12 dated December 1972 discloses recursive filters for suppressing ground echoes which have a desirable pass characteristic and can be improved relative to their build-up behaviour by the input of a substitute value equal to the first scanning value. Even with this measure, in the event of a deviation in the following scanning values from the first scanning value, a build-up process occurs which causes the intensity to be proportional to the extend to which the filter is designed for the discovery of objects carrying out a slow radial movement. The recursion weights of the filter must be matched to a given number of scanning values and this impairs the practical use of such apparatus in sequential detection processes and apparatus.

SUMMARY OF THE INVENTION

It is an object of the present invention to improve the detection of objects which are moving with slow radial movement in the presence of interference echoes caused by ground reflections. In the invention which relates to a radar device of the type described in the introduction above, this is achieved in that from the scanning values and signals received, there is subtracted an interference signal value which is recursively estimated from the scanning values using the recursion factor $\mu_i$ which varies over the scanning sequence in a manner such that a reduction is achieved in the interference due to ground reflections at the critical output and the detection of objects moving with a slow radial movement can be accomplished. As the recursion produces a better estimation of the interference echo with each scanning value, the circuit exhibits a favorable build-up behaviour.

A further advantage of the invention consists in that from the current scanning value there is deducted an estimated interference value which is obtained by recursion from the preceding scanning values of the same range increment and the difference produced is provided with a recursion factor which changes with each scanning and is added to the subtrahend for the following scanning value.

A preferred further development of the invention provides that the individual scanning sequences can possess a differing number of scanning values in particular for the execution of sequential detection processes. The recursion factor which changes during the course of the scanning obviates the need for the limitation required in prior art devices that the number of pulses associated with a particular scanning sequence must be previously known.

Other objects, features and advantages of the invention will be readily apparent from the following description of certain preferred embodiments thereof taken in conjunction with the accompanying drawing although variations and modifications may be effected without departing from the spirit and scope of the novel concepts of the disclosure and in which:

BRIEF DESCRIPTION OF THE DRAWING

The drawing comprises a block diagram illustrating the invention.

DESCRIPTION OF THE PREFERRED EMBODIMENTS

The drawing illustrates the circuit arrangement which in the signal processing of a radar device such as described above, is arranged in the inphase and in the quadrature channel and which is arranged ahead of a filter bank, that may be realized by a discrete Fourier transformation for differentiating various Doppler zones prior to the threshold decision of the detector. The individual scanning values 1 to N of a scanning sequence of a space increment are supplied to terminal 1. These signals are produced by a sample and hold circuit not illustrated and are removed from the received signal as individual samples. The start of a sampling sequence is established when the phase controlled radar antenna ("phased array") is moved to a new alignment. It is also possible that the beginning of a sampling sequence is defined by a change in the range zone to be detected.

The individual sampling signals 1 to N are fed to a subtractor 2 from terminal 1. The subtractor 2 receives a second input by way of line 14 and a switch 12 from an input terminal 13 at the start of the processing of the sampling sequence. The input supplied to terminal 13 is furnished from a storage device not illustrated which stores a first substitute value. At the start of a sampling sequence, the first substitute value is fed from the storer through terminal 13, switch 12 to the subtractor 2 and is subtracted from the first scanning value signal of the sampling sequence which arrives at the subtractor from terminal 1. In the case of the first scanning of a space-division increment, the substitute value supplied through terminal 13 may be zero. For this case, the unchanged input value signal present in the subtractor 2 is prevented from reaching the output line 7 because switch 4 will be opened at that time. If a suitable substitute value is available which is as close as possible to the interference component signal in the first sampling value, in other words, which is similar to the mean interference value signal from a preceding sampling of the same or an adjacent range increment, the difference signal from the subtractor 2 can be fed by way of the switch 4 to the output terminal 7 for further processing in a subsequently connected Doppler filter bank, not shown. These filters can consist of digital filter circuits or analog filter circuits (with CCD storage means) which are suitable for processing the individual sampling value signals. The first difference value signal from subtractor 2 is supplied to a multiplier 5 which has an input terminal to which is supplied a signal proportional to the recursion factor $\mu_i$. The recursion factor is always less than or equal to 1 and in a particular case of first scanning of a range increment will assume the sequence of $\mu_i = 1/i$ for $i = 1, \ldots, N$ where i is the number of the sampling value or alternatively it can be controlled according to a different law or characteristic which is stored in a storer or computer which supplies an input to terminal 6. It may be expedient to select the recursion factor $\mu_i$ as a constant after a predetermined number of sampling value signals have been received so as to suppress the slowly fluctuating components of the ground echoes. Subsequent to this time and at all future times, the effects of the circuit correspond to those of a purely recursive filter.

To explain in greater detail, by means of a series of sample runs, it is possible to determine the favorable sequence of the recursion factors $\mu_i$ and store these in a read storage means which is not illustrated in the drawing and which is connected to terminal 6. The value sequence of the recursion factors is in each case selected to be such that a favorable compromise is achieved with regard to the false alarm rate produced by the interference echo signals and the probability of detecting objects moving with a slow radial movement in zones subject to ground reflections.

The output of the multiplier 5 is connected by way of line 8 to an adder 9. The adder 9 also receives the substitute value which is fed to the second input of the subtractor 2 by way of line 14. The output of the adder 9 is supplied to a storage means 11 by line 10. After the first sampling value which is processed using the substitute value supplied to terminal 13, the switch 12 is moved to a second position and subsequently the input of the substitute value supplied to terminal 13 is not utilized. Switch 12 at this time, will from the second scanning sample and at all future times obtain the recursion value from the storage means 11 and this recursion value will have already been multiplied by the recursion factor $\mu_i$ in the multiplier 5 and processed in the adder 9 with the second sampling value arriving at input terminal 1. If a suitable substitute value from a preceding sampling interval is unavailable at terminal 13, at the time the switch 12 is moved to connect line 14 to the output of the storage means 11, the switch 4 will be closed and output signals will be supplied to output line 7 where they will be processed by the subsequently connected filters attached to output line 7. When a suitable substitute value is present at terminal 13, the difference of the first sampling value signal and the substitute value may also be fed by way of the close switch 4 to the output line 7 for purposes of further processing. The remainder of the processing cycle continues with switch 4 in the closed position and the output of the storage means 11 being connected by way of switch 12 to the subtractor 2 and the adder 9 until the end of the relevant sampling period, i.e. until the arrival of the N-th sampling signal value. At that time, preferably simultaneously to the switch-over of the antenna characteristic to a new space increment, the switch 12 will again be connected to terminal 13 and the cycle recommences from the beginning for the next sequence of sampling values 1 to N.

In the present invention, the cost of the storage means 11 is very low because only one value need be stored for each range increment in the storage means 11 and furthermore the number N of the number of stored sampling values within a scanning sequence need not be a specific value but can be arbitrarily selected. This will particularly facilitate a sequential detection which requires sequences with different numbers of sampling values ("sequential detection").

The circuit described and illustrated expeditiously utilizes the process discussed in "Short Course on Kalman Filter Theory and Application" of the Analytic Sciences Corporation, Reading, Massachusetts, USA shown as formula 4.1-4 on page 4.2 for a recursive estimation of the mean value $m_i$ with the recursion factor $\mu_i = 1/1$ from the sampling values $x_i$ where i indicates the number of the sampling signal, thus $i = 1, 2, \ldots N$ in the case where N-pulses from a range increment (i.e. for a sampling sequence). Then the equation $m_i = m_{i-1} + \mu_i (x_i - m_{i-1})$ is valid where $i = 1, \ldots, N$ with $m_o$ arbitrary. At the output 7, the circuit illustrated in the Figure thus produces output values $x_i - m_{i-1}$ for the individual values of $i = 2, 3, \ldots$ to N.

For alternately processing a plurality of sampling sequences particularly from successive range increments, it is merely necessary to extend the storage means 11 appropriately and to assign its contents to the individual separate range increments. This forms a type of t.d.m. operation wherein first the first sample signal values of the first, second, third etc. range increments for one direction follow one another whereupon the second sampling signal values of the first, second, third range increments etc. up to and including the N-th sampling signal values of each range increment is processed. In the storage means the individual correction values derived from the relevant range increment are sorted and stored in the correct sequence and are fed in the correct sequence by way of the input 14 to the subtractor 2 whenever a sampling signal value from the appropriate range increment arrives at the input 1 of the subtractor 2. If the circuit is to be inactive in specific range increments, in other words, if there are no ground echoes in a specific range zone, the value zero can pass from the input 13 by way of the switch 12 to the subtractor 2 and, thus, the sampling signal value at the input 1 can be emitted unchanged by way of the closed switch to the output line 7.

The circuit according to the invention may be considered as a single pole recursive filter having the time variable recursion factor $B = 1 - \mu_i$. The filter becomes a recursive filter when $\mu_i$ is kept constant.

The switches 12 and 4 also enable the circuit to be simply and easily disconnected in regions which do not have ground interference and are to be controlled by a background storage (clutter map) from range increment to range increment. For this case, the switch 4 remains closed and a "substitute value" of zero is supplied to the input terminal 13.

Although the invention has been described with respect to preferred embodiments, it is not to be so limited as changes and modifications can be made which are within the full intended scope of the invention as defined by the appended claims.

I claim as my invention:

1. A radar device particularly with a non-constantly scanning radar antenna, wherein a circuit arrangement for reducing the interference echoes due to ground reflection is provided comprising a subtracter (2) with a first input to which the scanning values are supplied and with output differential signals which are tapped for further processing, the second input of said subtractor (2) switchable with a line (14) and a switch (12) between a first storage means (13) which temporarily supplies a substitute value and a second means storage (11) which supplies an estimated recursion value formed by recursion of the preceding scanning values to the subtractor (2), a multiplier (5) with its first input connected to the output of the subtracter (2) and a third storage means (6) connected to the second input of the multiplier and said third storage supplying a recursion factor $\mu_i$, an adder (9) its output connected to the input of said second storage (11) and having a first input connected to the output of said multiplier (5) and a second input connected to said line (14) on which the substitute value or the recursion value are supplied.

2. A radar device according to claim 1 including a switch (4) connected between an output terminal and the output of said subtractor.

* * * * *